United States Patent [19]
Krishnakumar et al.

[11] Patent Number: 5,303,834
[45] Date of Patent: Apr. 19, 1994

[54] SQUEEZABLE CONTAINER RESISTANT TO DENTING

[75] Inventors: Suppayan M. Krishnakumar, Nashua; Wayne N. Collette, Merrimack; David P. Piccioli, Auburn, all of N.H.

[73] Assignee: Continental PET Technologies, Inc., Florence, Ky.

[21] Appl. No.: 19,023

[22] Filed: Feb. 18, 1993

Related U.S. Application Data

[60] Continuation-in-part of Ser. No. 962,243, Oct. 16, 1992, which is a division of Ser. No. 842,228, Feb. 26, 1992, Pat. No. 5,178,289.

[51] Int. Cl.$^5$ .............................. B65D 1/02; B65D 1/32
[52] U.S. Cl. .................................. 215/1 C; 220/666; 220/669; 220/675
[58] Field of Search ............... 215/1 C; 220/666, 669, 220/671, 675

[56] References Cited

U.S. PATENT DOCUMENTS

| | | |
|---|---|---|
| D. 294,462 | 3/1988 | Ota et al. . |
| D. 295,381 | 4/1988 | Papa . |
| D. 295,612 | 5/1988 | Ota . |
| D. 315,869 | 4/1991 | Collette . |
| D. 321,830 | 11/1991 | York et al. . |
| 521,501 | 6/1894 | Ireland . |
| 1,249,606 | 12/1917 | Eaton . |
| 3,335,902 | 8/1967 | Javorik . |
| 4,387,816 | 6/1983 | Weckman . |
| 4,512,490 | 4/1985 | Frei et al. . |
| 4,542,029 | 9/1985 | Caner et al. . |
| 4,749,092 | 6/1988 | Sugiura et al. . |
| 4,805,788 | 2/1989 | Akiho . |
| 4,805,793 | 2/1989 | Brandt et al. . |
| 4,818,575 | 4/1989 | Hirata et al. . |
| 4,863,046 | 9/1989 | Collette et al. . |
| 4,877,141 | 10/1989 | Hayashi et al. ............ 215/1 C |
| 4,946,053 | 8/1990 | Conrad . |
| 4,949,861 | 8/1990 | Cochran . |
| 4,993,565 | 2/1991 | Ota et al. . |
| 5,002,199 | 3/1991 | Frahm . |
| 5,005,716 | 4/1991 | Eberle . |
| 5,010,013 | 4/1991 | Serkes et al. . |
| 5,054,632 | 10/1991 | Alberghini et al. . |
| 5,064,081 | 11/1991 | Hayashi et al. . |
| 5,092,475 | 3/1992 | Krishnakumar et al. . |
| 5,126,177 | 6/1992 | Stenger . |
| 5,141,121 | 8/1992 | Brown et al. ............ 215/100 A |
| 5,178,289 | 1/1993 | Krishnakumar et al. ........ 215/1 C |
| 5,178,290 | 1/1993 | Ota et al. ................ 215/1 C |
| 5,238,129 | 8/1993 | Ota ........................ 215/1 C |

FOREIGN PATENT DOCUMENTS 0155763 9/1985 European Pat. Off. .

Primary Examiner—Allan N. Shoap
Assistant Examiner—Vanessa Caretto
Attorney, Agent, or Firm—Wolf, Greenfield & Sacks

[57] ABSTRACT

A squeezable container with a paneled side wall which resists permanent deformation or denting when squeezed, and which preferably can be hot-filled. The container can be made substantially thinner than known hot-fill containers and includes a stepped vacuum panel profile for greater flexibility and resilience (bounce back). A circumferential ring is provided in the side wall to prevent ovalizing. The post walls (surrounding the vacuum panels) are stiffened to prevent vacuum collapse, by providing a substantially perpendicular junction between the vacuum panel and post wall, sufficient post wall depth, and/or reinforcing ribs in the post walls.

26 Claims, 3 Drawing Sheets

SQUEEZABLE CONTAINER RESISTANT TO DENTING

BACKGROUND OF THE INVENTION

This application is a continuation in-part of commonly owned and copending U.S. Ser. No. 07/962,243 filed Oct. 16, 1992 entitled "PANEL DESIGN FOR A HOT FILLABLE CONTAINER" by Krishnakumar et al., which is a division of U.S. Ser. No. 07/842,228 filed Feb. 26, 1992, now U.S. Pat. No. 5,178,289 which issued Jan. 12, 1993.

The present invention relates to a squeezable container which exhibits "bounce back" to resist permanent deformation or denting, and in a preferred embodiment to a squeezable, dent resistant container which can withstand hot filling without substantial deformation.

Squeezable beverage containers are popular with bicycle riders and other athletes. These containers are typically made of polyethylene and may be squeezed between the fingers of one hand to dispense a liquid out a nozzle on the open top end of the container. However, the known polyethylene containers do not have the required thermal stability for receiving hot-fill (e.g., juice) products directly, and thus the squeezable container is typically sold separately from the beverage and the user then fills the container. It would be convenient if athletes and others could buy hot filled containers of juice as an "off-the shelf" item, which was both ready to-use and allowed repeated squeezable dispensing without permanent deformation.

Hot-fill containers are adapted for the packaging of liquids (e.g., juice, beer) and other food products (e.g., jam) which must be placed in the container while hot to provide for adequate sterilization. During filling, the container is subjected to elevated temperatures (i.e., the product temperature) and positive internal pressures (i.e., the filling line pressure). For example, a juice container may be exposed to a product temperature on the order of 180°–185° F. (82°–85° C.) and a filling line pressure on the order of 2–5 psi (30–75 atm). These temperatures and pressures may cause the container body to creep and/or shrink. An originally cylindrical container may "ovalize," i.e., increase in diameter in a nonuniform manner, especially in a tapered shoulder section between the neck finish and panel section. Containers with excessive shape distortion or ovalizing cause improper cap and label applications, and uneven or inadequate vacuum panel movement.

A biaxially-oriented polyethylene terephthalate (PET) beverage bottle designed to receive a hot fill product with a minimum of thermal shrinkage and distortion is described in U.S. Pat. No. 4,863,046 entitled "Hot Fill Container," which issued Sep. 5, 1989 to Collette et al., and is hereby incorporated by reference in its entirety. The Collette et al. container was designed as a relatively large volume (32 or 64 ounces) beverage container. It has six symmetrically-disposed vacuum panels in the side wall of the container. The vacuum panels (all of them) deform and move radially inwardly in unison as the product cools in order to reduce the magnitude of the vacuum generated in the filled and capped container and to prevent any large uncontrolled shape distortion of the container. A wrap around label covers the vacuum panels and is supported by post walls surrounding the vacuum panels and a central panel wall in each panel. Vertical recessed ribs may be provided in the post walls to increase the longitudinal stiffness of the panel section.

The design of the vacuum panels may vary; two other designs are illustrated in: 1) U.S. Design Pat. No. 315,869 entitled "Container Body For Liquids Or The Like," which issued Apr. 2, 1991 to Collette; and 2) copending and commonly-owned U.S. patent Ser. No. 07/792,449 entitled "Modular Mold," which was filed Nov. 15, 1991 by Collette et al., each of which is hereby incorporated by reference in its entirety.

However, the previously described hot fill containers were designed for pouring, not squeezing. In fact, these typically large diameter bottles would permanently deform inwardly (buckle) if a user tried to push inwardly on the sidewall of the container to dispense the product by squeezing. Thus, the known PET hot fill containers have not been used as squeezable containers.

It is an object of the present invention to provide a squeezable plastic container with panels that resists permanent deformation or denting. More preferably, it is an object of this invention to provide a squeezable container which is hot fillable.

Summary of the Invention

The container of this invention is squeezable, without undergoing permanent deformation or denting, and preferably is able to receive a hot fill product without undergoing excessive shape distortion. The container includes flexible vertically elongated panels in the side wall of the container, and stiffer post walls around the panels. The panels include a recess around a raised central panel wall and a connecting wall between the recess and panel wall is stepped to provide resilience. The flexible panels bow inwardly when squeezed and readily return (bounce back) to their original position and shape when released.

Stiffening of the post walls around the panels is preferably achieved by providing substantially perpendicular junctions between the post wall and panel and by providing sufficient post depth (i.e., radial distance between the panel recess and post wall). In a preferred hot-fill embodiment, the stiff post walls prevent vacuum collapse of the container, while the multiple flex points and thin wall of the vacuum panels insure adequate movement under vacuum and enhance the flexibility and resilience (to prevent denting) of the panel section.

It is preferable to provide a recessed circumferential ring in the side wall of the container to further minimize any shape distortion caused by filling with a hot product. This ring prevents a cylindrical container from ovalizing, especially in the tapered shoulder section of the container.

Still further, vertically elongated ribs may be provided in the post wall to further stiffen the side wall against vacuum collapse.

In a specific embodiment, a squeezable hot-fill container comprises a hollow plastic body having a resilient cylindrical side wall with a plurality of symmetrical vacuum panels aligned along a vertical centerline, an open upper end, and a closed bottom wall. The side wall includes symmetrically-arranged post walls disposed a first distance $D_1$ from the vertical centerline. The vacuum panels are disposed between the post walls and each vacuum panel includes a vertically elongated recess surrounding a raised central panel wall. The recess has a lowermost flex point which is disposed a second distance $D_2$ from the vertical centerline which is less than the first distance $D_1$ of the post wall. The central panel is disposed radially outwardly from the lowermost flex point and a first connecting wall between the lowermost flex point and panel wall is stepped to provide flexibility and resilience. Preferably, a second connecting wall between the lowermost flex point and post wall is also stepped. The preferred container is a blow molded biaxially-oriented container made of a thermoplastic resin, and in particular a polyester such as a homopolymer or copolymer of polyethylene terephthalate, and preferably the panel section has an average wall thickness on the order of about 0.015″ (0.38 mm) to about 0.020″ (0.51 mm). In a preferred small diameter (i.e., no more than about four inch) size container adapted to be squeezed in one hand, the average panel wall thickness is about 0.015 inches (0.38 mm) to about 0.017 inches (0.44 mm).

Further details of the invention are more specifically described by the following drawings and description of certain preferred embodiments.

DETAILED DESCRIPTION

Figure 7:
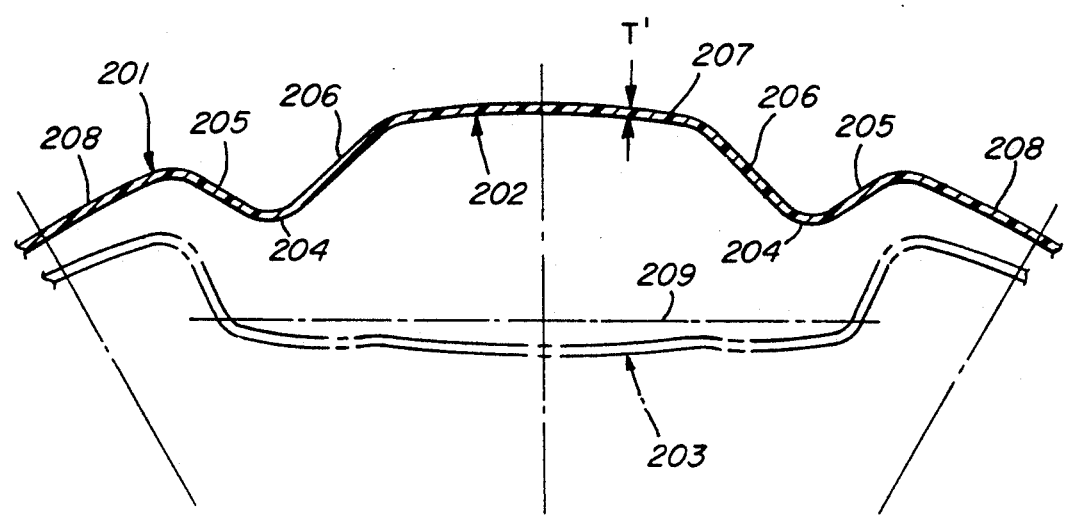
FIG. 7 is a partial cross-sectional view of a comparative panel wall without the features of this invention, and which undergoes permanent deformation when squeezed.

A sectional panel view of a comparative PET hot-fill container is shown in FIG. 7. This comparative panel does not utilize the stepped wall construction of the present invention and undergoes permanent deformation when squeezed.

The comparative container of FIG. 7 has a side wall 201 with a vacuum panel 202 shown between a pair of post walls 208. The vacuum panel in its original (prior to squeezing) form is shown in solid lines as panel 202, and after squeezing in dashed lines as panel 203 which has undergone permanent deformation or denting. The panel includes a recess 204 having an outer connecting wall 205 adjacent the post wall 208 and an inner connecting wall 206 adjacent the raised central panel wall 207. The panel geometry and typical hot-fill wall thickness T′ (e.g., 0.022 inches (0.56 mm)) create a stiff panel which "locks up" and remains permanently deformed when it passes over the dashed center line 209. Thus, although this comparative container may have the necessary thermal stability and vacuum resistance for use with hot-fill products, it cannot be used as a squeezable container because it undergoes permanent deformation when squeezed.

Figure 3:
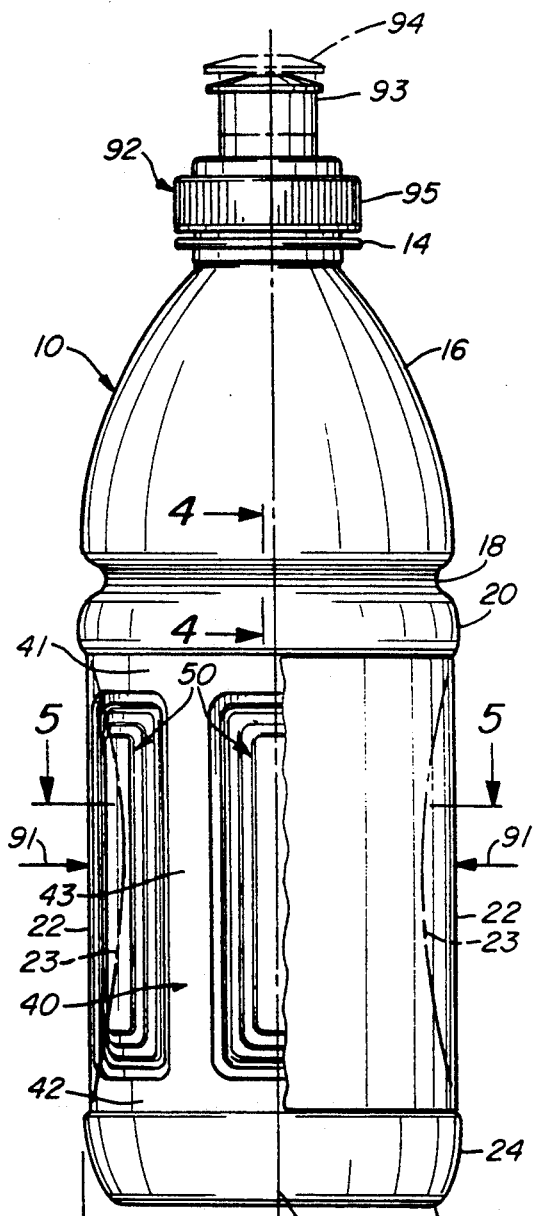
FIG. 3 is a front elevational view, partially in section, of a first preferred embodiment of this invention which is a hot fill squeezable container.

In accordance with this invention, a preferred hot-fill squeezable container 10 is provided as shown in FIG. 3. In this specific embodiment, the container is a 20-ounce, substantially transparent biaxially oriented PET beverage container which is about 7.87 inches (200 mm) in height (without the cap) and about 2.83 inches (72 mm) in outer diameter (at the panel section). The panel section 22 has been biaxially oriented and partially crystallized by being axially stretched and radially expanded in a blow mold, and has an average wall thickness of about 0.016 inches (0.41 mm). This is considerably thinner than the prior known hot-fill containers which have had a wall thickness of about 0.022 inches (0.56 mm) to 0.024 inches (0.62 mm).

Figure 1:
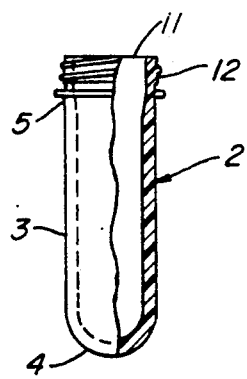
FIG. 1 is a front elevational view, partially in section, of a preform for use in blow molding a container of this invention.
Figure 2:
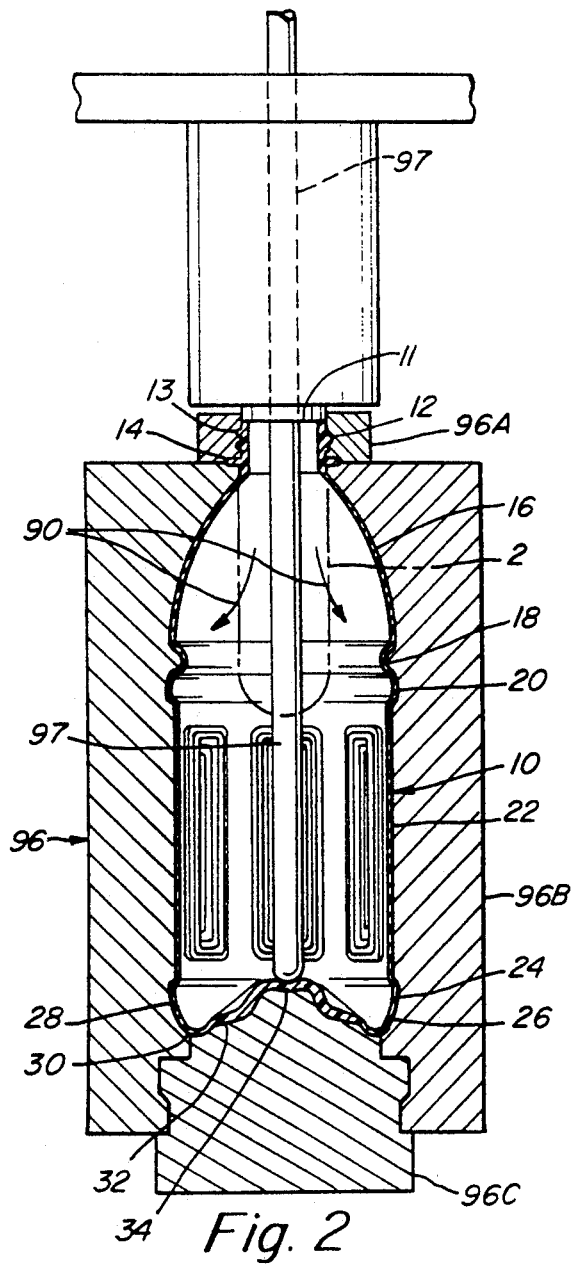
FIG. 2 is a cross-sectional view of a blow molding apparatus in which the preform of FIG. 1 is expanded to form a container of this invention.

As illustrated in FIGS. 1-2, the container 10 is blow molded from a cylindrical injection-molded preform 2 having an open top end 11 and neck finish 12. The preform has a tapered shoulder-forming portion 5, substantially uniform thickness panel forming portion 3, and a base-forming portion 4 including a substantially hemispherical bottom end. The preform 2 is amorphous and substantially transparent and preferably is made from a PET monomer or copolymer (e.g., up to about 6% copolymer). However, other materials and preform shapes can be used, including preforms with thickened base forming portions to provide a thicker container base having improved creep resistance, or preforms with variable wall thickness portions in the side wall if desired.

As shown in FIG. 2, the preform 2 is placed in a blow molding apparatus 96 having an upper mold section 96A which engages the neck finish 12, a middle mold section 96B having an interior cavity forming the shape of the container side wall, and a lower mold section 96C having an upper surface forming the outwardly concave dome portion of the container base. In accordance with a standard reheat stretch blow mold process, the injection-molded preform 2 is first reheated to a temperature suitable for stretching and orientation, placed in the blow mold, and an axial stretch rod 97 is then inserted into the open upper end 11 and moved downwardly to axially stretch the preform. Subsequently or simultaneously an expansion gas 90 is introduced into the interior of the preform to radially expand the shoulder, sidewall and base forming portions outwardly into contact with the interior surfaces of mold sections 96B and 96C.

As shown in FIGS. 2-3, the blown container has the same neck finish 12 with outer threads 13 and lowermost neck flange 14 as the preform. The remainder of the bottle has undergone expansion, although to varying degrees. An upper tapered shoulder portion 16 gradually increases in diameter and orientation while moving downwardly along the bottle. Next, a radially recessed circumferential ring 18 is provided between the shoulder section 16 and panel section 22 to prevent ovalizing. Below the ring 18 is a radially outwardly projecting upper bumper portion 20, and then a slightly recessed cylindrical panel section 22. Below the panel section is a radially outwardly projecting lower bumper 24, and then a champagne-style base 26. The base includes an outer base wall 28 gradually reducing in diameter moving downwardly from the upper bumper 24 to a lowermost contact radius 30 on which the bottle rests. Radially inwardly of the contact radius is a recessed inner base wall 32 or dome having a central gate region 34. The inner base wall or dome 32 may include a number of symmetrical recessed petaloid portions for increasing the thermal resistance of the base, as is known in the art. In general, the relatively low oriented base has a greater thickness for strength, while the panel section 22 has a relatively high orientation for strength.

The cylindrical panel section 22 includes six equally sized and symmetrically arranged recessed vacuum panels 50 disposed about a vertical centerline 8. Surrounding each vacuum panel are post walls 40, which include upper post wall 41, lower post wall 42, and median post wall 43. A label (not shown) is wrapped around panel section 22 and lies in substantially smooth contact with all portions 41, 42, 43 of the post wall, and may be adhesively attached to upper and lower post walls 41, 42.

As shown in FIG. 3, a removable cap 92 is attached to the open upper end of the container. The cap includes a base portion 95 having internal threads which engage the outer threads 13 on neck finish 12. At the upper end of the cap 92 is a sliding nozzle shown in a lowermost closed position 93 and an uppermost open position 94 (in dashed lines). When the panel section 22 of the container is squeezed between the user's fingers (see opposing force lines 91 in FIG. 3), the panel deflects inwardly (see dashed panel lines 23) and the liquid product in the container is pushed out the open upper nozzle 94 by the internal pressure generated by squeezing.

Figure 4:
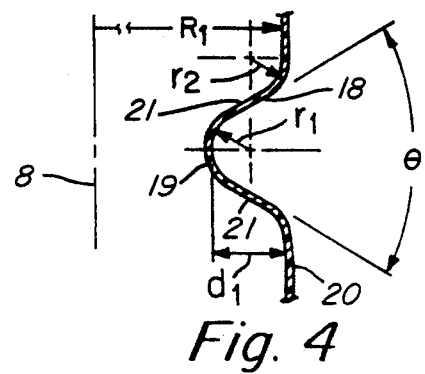
FIG. 4 is a partial cross sectional view taken along section lines 4—4 of FIG. 3, showing the outwardly-concave circumferential ring between the shoulder section and panel section which increases the resistance to ovalizing.

FIG. 4 shows in cross section the circumferential ring 18 disposed between the shoulder section 16 and upper bumper 20. The container side wall (outermost circumference) is disposed at a radial distance $R_1$ from the vertical centerline 8. The ring 18 is recessed inwardly at a distance $d_1$ from the outermost circumference. The ring 18 has a lowermost recess 19 of radius $r_1$, outwardly expanding sidewall portions 21 which define an angle $\theta$, and radiused junctions with the outermost circumference defined by radius $r_2$. The specific dimensions, including the angular extent $\theta$, depth ($d_1$), and values of radiuses $r_1$ and $r_2$, are determined by the specific geometry and resin properties of the container. Preferably the ring depth is about $0.10R_1$ to about $0.24R_1$ (where $R_1$ is the radius of the container) and the angular extent $\theta$ is about 45° to about 90°. The lowermost recess preferably has a radius $r_1$ of about $0.3d_1$ to about $0.7d_1$ and the connecting radius $r_2$ is at least about $0.3d_1$.

Figure 5:
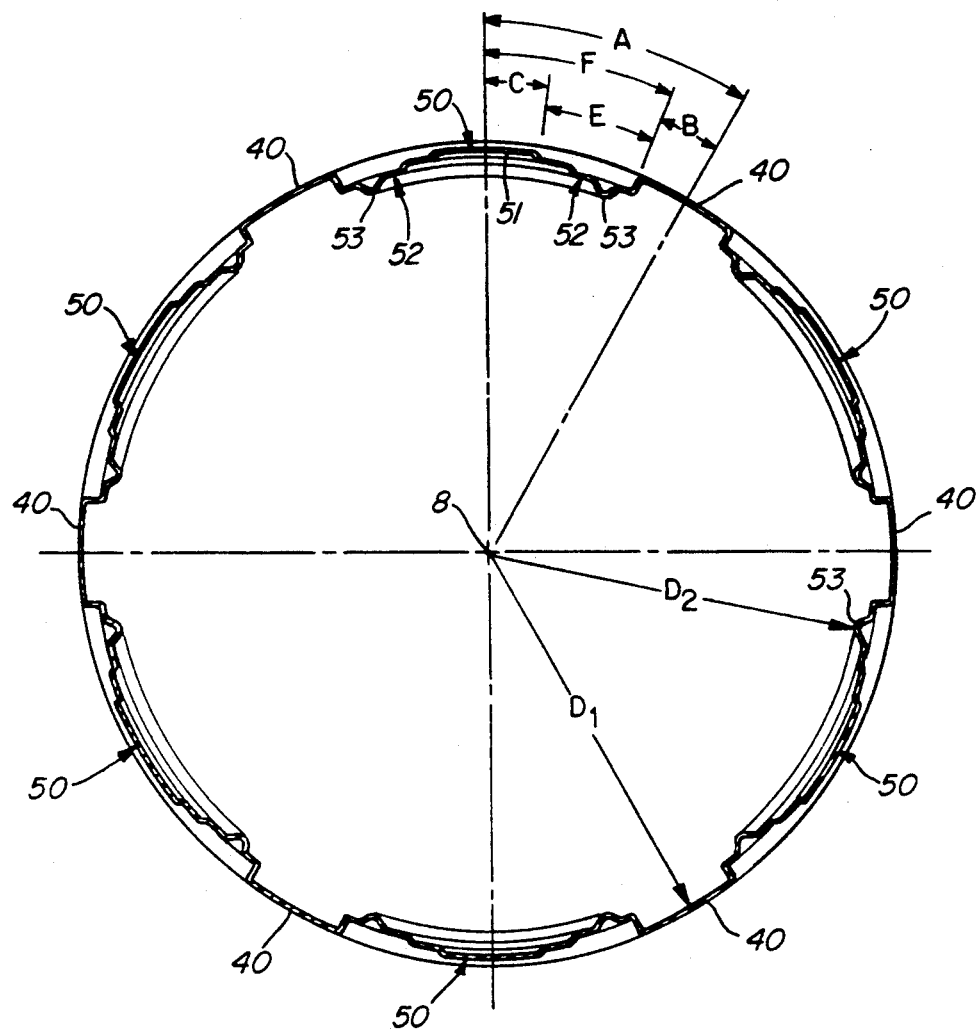
FIG. 5 is a cross-sectional view through the panel section of the container of FIG. 3 taken along section lines 5—5 of FIG. 3, sowing six equally sized and symmetrically arranged vacuum panels separated by post walls, and the relative angular extents and depths of the various vacuum panel portions.
Figure 6:
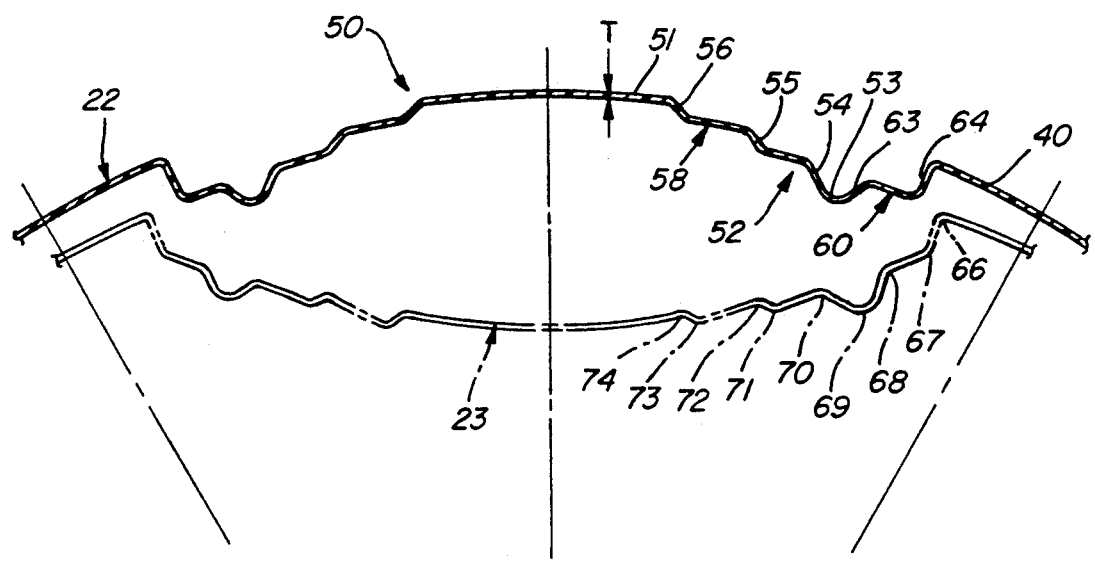
FIG. 6 is a partial cross sectional view of one vacuum panel of the container of FIG. 3 showing in phantom lines the panel when flexed, and illustrating the action of the multiple flex points which allow ready squeezability and return to the original undeformed position.

As shown in FIG. 5, there are six symmetrical vacuum panels 50 disposed about the vertical centerline 8 of the container. FIG. 6 shows one of the vacuum panels 50, having a wall thickness T, and the manner in which it temporarily deforms when squeezed (dashed lines 23) and then returns to its substantially original undeformed position. The vacuum panel 50 lies between a pair of post walls 40 which are disposed at a distance $D_1$ from the vertical centerline 8. The post walls 40 are at the greatest distance from the centerline of any portion of the panel section 22 (however, upper and lower bumpers 20 and 24 extend slightly outwardly from the panel section 22 to protect the label which is wrapped around the panel section).

Each post wall 40 has an angular extent 2B and each vacuum panel 50 has an angular extent 2F, such that the total combined angular extents of all post walls and vacuum panels, i.e., 6(2F+2B)=360° (the total panel circumference). Because there are six equal vacuum panels, the allowable angular extent 2A for each vacuum panel and its associated post wall is 60° (i.e., 360°÷6=60°). Preferably, each post wall has an angular extent 2B of about 12° to about 21° and each vacuum panel has an angular extent 2F of about 39° to about 48°.

Each vacuum panel 50 includes a vertically elongated recess 52 with a lowermost flex point 53 at a distance $D_2$ from vertical centerline 8, which is less than the distance $D_1$ of post wall 40. The recess 52 surrounds a raised central panel wall 51, which is at a greater distance from the vertical centerline 8 than the distance $D_2$. Preferably, each panel wall 51 has an angular extent 2C of about 12° to about 30°. Preferably, the ratio of the panel height H (FIG. 3) to width (circumference) to insure ease of squeezability is at least about 2:1.

Recess 52 has a lowermost flex point 53 and intermediate stepped connecting walls joining the flex point 53 with central raised wall 51 and post wall 40. As best shown in FIG. 6, in going from lowermost flex point 53 to panel wall 51, there is a first connecting wall 58 having a first step 54, a second step 55, and a third step 56 disposed at radially increasing distances from the vertical centerline 8. In going from lowermost flex point 53 to post wall 40, there is a second connecting wall 60 having a first step 63 and second step 64 at radially increasing distances from the vertical centerline 8. These stepped walls form nine flex points, designated as 66, 67, 68, 69, 70, 71, 72, 73 and 74, and which, together with the thin panel wall, render the vacuum panels very flexible and resilient. The average panel wall thickness is preferably about 0.015 inches (0.28 mm) to about 0.020 inches (0.51 mm). The "average" thickness includes the central panel 51 and first and second connecting walls 58 and 60. Typically, the entire circumference of the side wall is of fairly uniform thickness, when a uniform thickness preform is used. However, in some cases it may be desirable to provide a thicker post wall 40 (e.g., by providing a variable thickness preform) for greater stiffness. Still further, the connecting walls 58, 60 may be made thinner than the central panel 51 for still greater flexibility.

In order to counterbalance the flexibility provided by the thin wall and multiple flex points of the panel, it is necessary to stiffen the post walls 40 to provide the necessary resistance to vacuum deformation, while still providing a squeezable bottle which will not permanently dent when squeezed. To increase the post wall stiffness, there are preferably provided substantially perpendicular junctions between second step 64 and post wall 40, and between second step 64 and first step 63. These junctions preferably range from about 80° to about 100°, and more preferably about 85° to about 95°. Also, in order to insure sufficient stiffness in the post wall, the post depth (i.e., $D_1$-$D_2$) is preferably about 0.08 inches (2 mm) to about 0.16 inches (4 mm), which corresponds to the radial depth of the second connecting wall.

Figure 8:
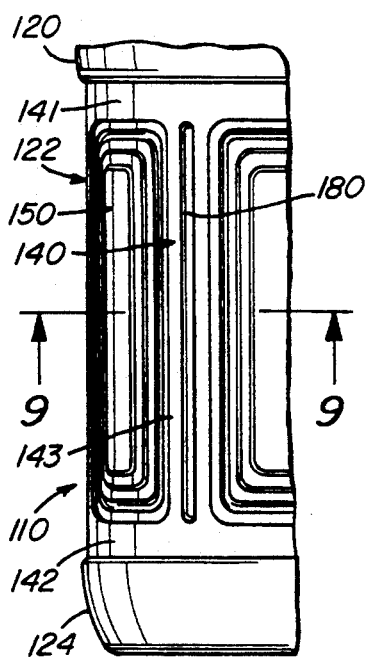
FIG. 8 is a partial elevational view of an alternative embodiment of this invention, namely, a vacuum panel container having an additional stiffening rib in the post wall.
Figure 9:
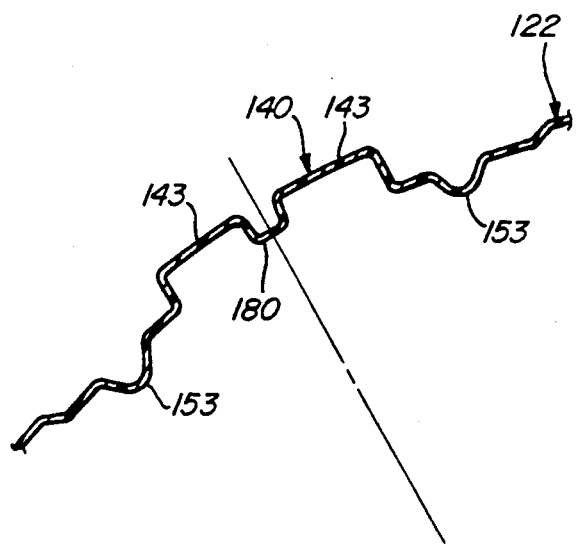
FIG. 9 is a partial cross sectional view taken along section lines 9—9 of FIG. 8 showing the additional stiffening rib.

FIGS. 8–9 show an alternative embodiment, wherein an additional vertically-elongated reinforcing rib 180 is provided to further stiffen the post walls. Alternative container 110 is substantially the same as previously defined container 10, and similar portions have been given similar number designations in the "100" series. Thus, container 110 has an upper bumper 120, lower bumper 124, and a panel section 122. Surrounding each vacuum panel 150 are post walls 140, including upper post wall 141, lower post wall 142, and median post walls 143. Down the center of each median post wall 143 is a vertically elongated and radially inwardly recessed rib 180. Again, each vacuum panel includes a lowermost flex point 153 and stepped connecting walls.

The present invention has applications beyond the illustrated beverage container with nozzle for use by athletes. More generally, the container may be used for any cosmetic, food, beverage, etc., product which requires a squeezable container with panels. The product may be pressurized, e.g., beer, or nonpressurized, e.g., juice. The container may be used with cold-fill products, wherein the stepped panel construction provides ready squeezability with "bounce back" to resist denting.

The container may be made in a variety of sizes (volume) and shapes (height and diameter). For example, one-gallon hot fill squeezable PET beverage container may have a six-inch diameter and an average panel wall thickness of about 0.017 inches (44 mm) to about 0.020 inches (51 mm).

The preferred thermoplastic resins useful for making a hot-fill container of this invention include polyester, polypropylene, polycarbonate, polyacrylonitrile, polyvinyl chloride and polyethylene napthalene.

The preferred polyester resins are usually polyesters wherein more than 80 mol %, and preferably more than 90 mol % of the acid component is terephthalic acid and more than 80 mol %, and preferably more than 90 mol % of the glycol component is isophthalic acid (IPA), diphenylether 4,4'-dicarboxylic acid, naphthalene-1,4 or 2,6-dicarboxylic acid, adipic acid, sebasic acid, decane 1,10-dicarboxylic acid and hexahydroterephthalic acid. Examples of the residual glycol component are propylene glycol, 1,4-butane diol, neopentyl glycol, diethylene glycol, cyclohexane dimethanol (CHDM), 2,2-bis(4-hydroxyphenyl)- propane and 2,2-bis(4hydroxyethoxyphenyl)propane. Also available are polyester resins containing p-oxybenzoic acid, etc. as an oxyacid.

The intrinsic viscosity of these thermoplastic polyester resins is approximately 0.55 or more, preferably about 0.65 to about 1.4, and more preferably about 0.8 to about 0.9. When the intrinsic viscosity is less than 0.55, it is difficult to obtain a preform which is transparent and amorphous. In addition, the mechanical strength of the resulting container is not sufficient. Intrinsic viscosity measurements are made according to the procedure of ASTM D-2857, by employing 0.0050±0.0002 g/ml of the polymer in a solvent comprising o-chlorophenol (melting point 0° C.), at 30° C. Intrinsic viscosity (I.V.) is given by the formula:

$$I.V. = (\ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

PET copolymer resins useful in this invention are commercially available and include copolymers having 4–6% by total weight of a comonomer such as 1,4-cyclohexanedimethanol (CHDM) and/or isophthalic acid (IPA). These materials are commercially available from Eastman Chemical Company in Kingsport, Tennessee, and Goodyear Tire & Rubber Co. in Akron, Ohio.

In making the preferred polyester container from an amorphous preform according to the reheat stretch blow process, a suitable stretching temperature range is about 70°–130° C. It is advisable to stretch the preform about 2–4 times in an axial direction and about 3–5 times in a circumferential direction. A more preferable condition is 6–15 times in terms of a stretch ratio for area—and more preferably about 7–11 times in the panel section.

It may also be useful to provide a multi-layer preform, e.g., with one or more barrier layers, for a specific product which is degraded by oxygen, moisture, light, etc.

Although certain preferred embodiments of the invention have been specifically illustrated and described herein, it is to be understood that variations may be made without departing from the spirit and scope of the invention as defined by the appended claims. Thus, all variations are to be considered as part of the invention as defined by the following claims.

What is claimed is:

1. A squeezable, dent resistant plastic container with panels, the container comprising:

a squeezable hollow plastic body having a resilient and substantially cylindrical side wall aligned along a vertical centerline, an open upper end for dispensing a product when the side wall is squeezed, and a closed bottom wall;

the side wall including a plurality of symmetrically arranged post walls disposed at a first distance $D_1$ from the vertical centerline;

the side wall further including a plurality of symmetrically arranged panels disposed between the post walls, each panel having a vertically elongated recess surrounding a central panel wall, the recess having a lowermost flex point disposed a second distance $D_2$ from the vertical centerline which is less than the first distance $D_1$, and the central panel wall being disposed at a distance from the vertical centerline which is greater than the second distance $D_2$; and the recess having a first connecting wall with at least one intermediate step between the lowermost flex point and central panel wall to increase the resistance of the squeezable side wall to permanent deformation.

2. The container of claim 1, wherein the container is a hot fill container and the panels are vacuum panels.

3. The container of claim 1, wherein the side wall further includes a radially recessed circumferential ring to increase the side wall resistance to ovalizing.

4. The container of claim 3, wherein the side wall includes a tapered shoulder above the panels, and the circumferential ring is disposed between the panels and shoulder.

5. The container of claim 1, wherein the container is a blow-molded biaxially-oriented thermoplastic container.

6. The container of claim 5, wherein the thermoplastic is polyester.

7. The container of claim 6, wherein the polyester is substantially polyethylene terephthalate (PET).

8. The container of claim 7, wherein the PET includes 0 to about 6% copolymer.

9. The container of claim 2, wherein the hot fill container is made from a plastic selected from the group consisting of polyester, polypropylene, polyvinyl chloride, polyethylene napthalate, polycarbonate, polyacrylonitrile and copolymers and blends thereof.

10. The container of claim 1, wherein the side wall has an average wall thickness of about 0.015 to about 0.020 inches.

11. The container of claim 10, wherein the side wall has an average wall thickness of about 0.015 to about 0.017 inches and a diameter of up to about 4 inches.

12. The container of claim 11, wherein the side wall has a diameter of about 2.5 to about 3.5 inches.

13. The container of claim 1, wherein the panel has an average wall thickness of about 0.015 to about 0.020 inches.

14. The container of claim 13, wherein the panel has an average wall thickness of about 0.015 to about 0.017 inches.

15. The container of claim 1, wherein each post wall further includes a vertically-elongated post rib for stiffening the post wall.

16. The container of claim 1, wherein the recess includes a second connecting wall between the lowermost flex point and post wall, and the second connecting wall has a substantially perpendicular junction with the post wall in order to stiffen the post wall.

17. The container of claim 16, wherein the second connecting wall has a first step portion having a substantially perpendicular junction with the post wall, and a second step portion having a substantially perpendicular junction with the first step portion.

18. The container of claim 16, wherein the second connecting wall has a radial depth of from about 0.08 to about 0.16 inches.

19. The container of claim 1, wherein the first connecting wall includes a plurality of steps to provide additional flex points.

20. The container of claim 1, wherein the recess includes a second connecting wall with at least one step between the lowermost flex point and post wall.

21. The container of claim 1, wherein the lowermost flex point is an outwardly concave radius which enhances the flexibility and resilience of the panel wall.

22. The container of claim 3, wherein the circumferential ring has a radial depth $d_1$ of about $0.10R_1$ to about $0.24R_1$, where $R_1$ is the distance from the vertical centerline to the side wall.

23. The container of claim 22, wherein the circumferential ring has an angular extent of about 45° to about 90°.

24. The container of claim 23, wherein the circumferential ring has a lowermost recess of radius $r_1$ of about $0.3d_1$ to about $0.7d_1$ and a connecting radius $r_2$ with the side wall of at least about $0.3d_1$.

25. The container of claim 1, wherein each panel has a height H along the vertical centerline and a width W along the circumference of the side wall, and the ratio of H:W is at least about 2:1.

26. The container of claim 1, wherein each panel has an angular extent 2F of about 39° to about 48°.

* * * * *